US010005327B2

(12) United States Patent
Krempel

(10) Patent No.: US 10,005,327 B2
(45) Date of Patent: Jun. 26, 2018

(54) SELF-INFLATING PUMPING MECHANISM

(71) Applicant: Benjamin J. Krempel, Saint Charles, IL (US)

(72) Inventor: Benjamin J. Krempel, Saint Charles, IL (US)

(*) Notice: Subject to any disclaimer, the term of this patent is extended or adjusted under 35 U.S.C. 154(b) by 0 days. days.

(21) Appl. No.: 15/301,470

(22) PCT Filed: Mar. 25, 2015

(86) PCT No.: PCT/US2015/022499
§ 371 (c)(1),
(2) Date: Oct. 3, 2016

(87) PCT Pub. No.: WO2015/153227
PCT Pub. Date: Oct. 8, 2015

(65) Prior Publication Data
US 2017/0174016 A1    Jun. 22, 2017

Related U.S. Application Data

(60) Provisional application No. 61/975,559, filed on Apr. 4, 2014.

(51) Int. Cl.
*B60C 23/12* (2006.01)
(52) U.S. Cl.
CPC .......... *B60C 23/12* (2013.01); *B60C 2200/12* (2013.01)
(58) Field of Classification Search
CPC .................................................. B60C 23/12
See application file for complete search history.

(56) References Cited

U.S. PATENT DOCUMENTS

| 615,187 A * | 11/1898 | Kersting ................. B60C 23/12 |
| | | 152/426 |
| 1,050,886 A * | 1/1913 | Wetherell ............... B60C 23/12 |
| | | 152/426 |
| 2005/0126273 A1 | 6/2005 | Hrabal |
| 2006/0021690 A1 * | 2/2006 | Bunker ................... B60C 23/12 |
| | | 152/419 |

(Continued)

FOREIGN PATENT DOCUMENTS

| DE | 3433318 A1 * | 3/1986 | ............. B60C 23/12 |
| DE | 4323835 A1 * | 1/1995 | ........... B60C 23/004 |

(Continued)

*Primary Examiner* — Kip T Kotter
(74) *Attorney, Agent, or Firm* — Lumen Patent Firm

(57) ABSTRACT

A compression device for a self-inflating tire is provided that includes a first surface made from a flexible memory material, where the first surface is mechanically connected to a pumping chamber, where the first surface includes a first arm, a second arm and a fulcrum along an X-Y plane, where the fulcrum is disposed between the first arm and the second arm, an arc-shape length along a Y-Z plane that is configured to conform to an inner surface of a tire, a first state, where when in the first state, the first surface conforms to an unloaded, pressurized inner surface of the tire, and a second state, where when in the second state, the first surface collapses radially outward about the fulcrum by the first arm and the second arm, where air is drawn in from the atmosphere and pushed through the pumping chamber into the tire.

8 Claims, 4 Drawing Sheets

(56) References Cited

U.S. PATENT DOCUMENTS

| | | | |
|---|---|---|---|
| 2009/0044891 A1* | 2/2009 | Lee | B60C 11/00 152/416 |
| 2010/0243121 A1* | 9/2010 | Eigenbrode | B60C 23/12 152/419 |
| 2012/0285596 A1* | 11/2012 | Hrabal | B60C 23/12 152/450 |
| 2014/0110030 A1* | 4/2014 | Krempel | B60C 23/12 152/450 |

FOREIGN PATENT DOCUMENTS

| | | | | |
|---|---|---|---|---|
| WO | WO-2010008338 A1 * | 1/2010 | | B60C 23/12 |
| WO | WO2014/030075 A2 | 2/2014 | | |

* cited by examiner

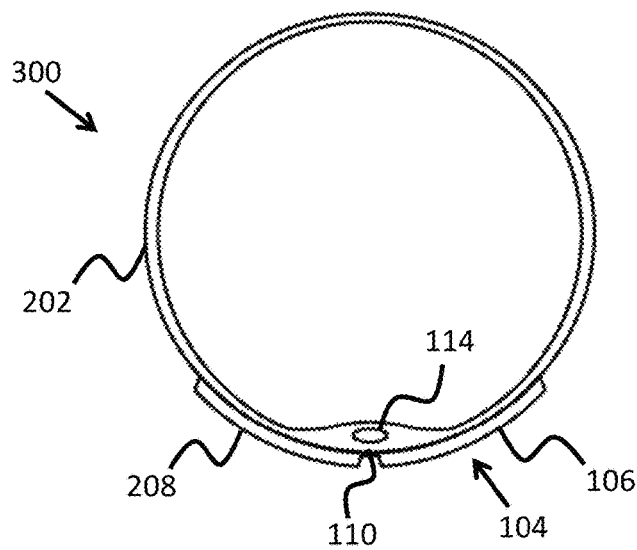
FIG. 5
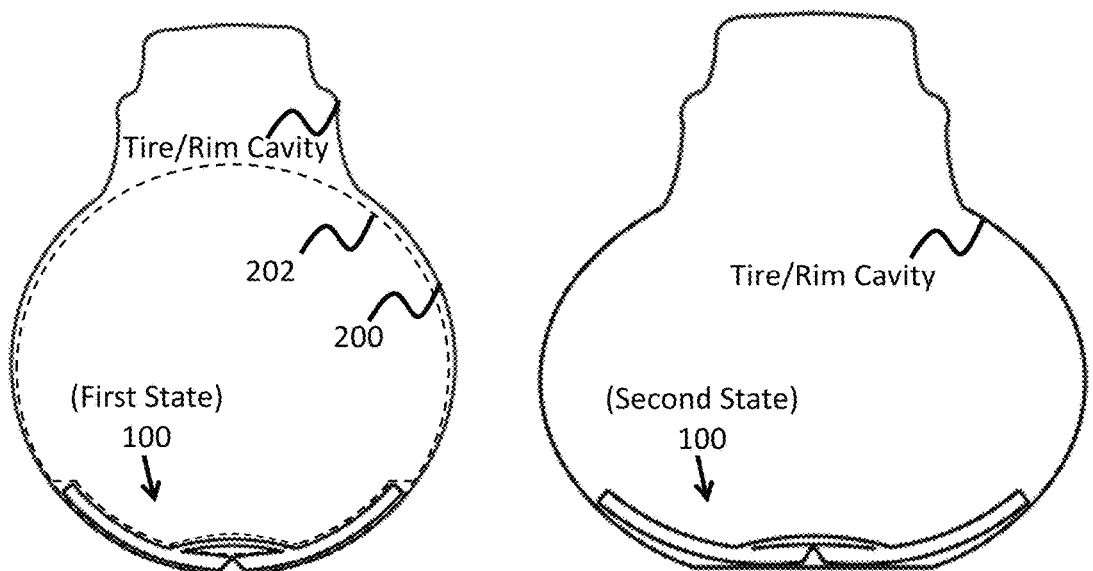
FIG. 6A  FIG. 6B

SELF-INFLATING PUMPING MECHANISM

CROSS-REFERENCE TO RELATED APPLICATIONS

This application is a 371 of PCT Patent Application PCT/US2015/022499 filed Mar. 25, 2015, which claims the benefit of U.S. Provisional Application 61/975,559 filed Apr. 4, 2014.

FIELD OF THE INVENTION

The current invention generally relates to self-inflating tires. More specifically, the invention relates to a compression element for a self-inflating tire system.

BACKGROUND OF THE INVENTION

There is a long-standing need for improving tire reliability and resistance to deflation in bicycles and other wheeled vehicles. Many attempts have been made to mitigate flat tires using self-inflating systems that include piston-in-cylinder designs, rim mounted designs, and hub mounted designs. The piston-in-cylinder design suffers from several disadvantages that include poor ride quality and handling, a noticeable bump in the tire surface, complicated mechanical elements that are prone to breaking, and limited pumping volume. The rim mounted and hub mounted designs have shortcomings that include expensive to make and use, requiring installation by a skilled technician, considered as a specialty product or optional equipment, and are they not compatible with other hub mounted equipment.

What is needed is a reliable, inexpensive and effective compression device for self-inflating tire systems.

SUMMARY OF THE INVENTION

To address the needs in the art, a compression device for a self-inflating tire is provided that includes a first surface made from a flexible memory material, where the first surface is mechanically connected to a pumping chamber, where the first surface includes a first arm, a second arm and a fulcrum along an X-Y plane, where the fulcrum is disposed between the first arm and the second arm, an arc-shape length along a Y-Z plane that is configured to conform to an inner surface of a tire, a first state, where when in the first state, the first surface conforms to an unloaded, pressurized inner surface of the tire, and a second state, where when in the second state, the first surface collapses radially outward about the fulcrum by the first arm and the second arm, where the change between the first state and the second state results in air being drawn in from the atmosphere and pushed through the pumping chamber.

According to one aspect of the invention, a second surface is disposed on the first surface, where the second surface includes an elastic material having a curved cross section in an X-Y plane and an arc-shape length along a Y-Z plane.

In another aspect of the invention, the pumping chamber includes a pneumatically sealed pumping chamber.

In a further aspect of the invention, the pumping chamber is configured to house a pneumatically sealed lumen.

According to another aspect of the invention, the arc-shape length spans an entire circumference of the inner tire surface, or spans a segment of the circumference of the inner tire surface.

In yet another aspect of the invention, the fulcrum includes a hinge.

According to one aspect of the invention, the fulcrum includes a reduced-thickness of the flexible memory material relative to a thickness of the second arm and the first arm.

According to a further aspect of the invention, the second surface and the first surface are anisotropic having greater rigidity in the X-Y plane compared to the Y-Z plane.

In another aspect of the invention, the compression device is irremovably attached to an inner tube.

BRIEF DESCRIPTION OF THE DRAWINGS

FIG. 5 shows the compression device having a separate second surface and pumping chamber integrated into the inner tube extrusion, according to one embodiment of the invention.

FIGS. 6A-6B show the compression device implemented in a tire with an inner tube and without an inner tube, respectively, according to embodiments of the invention.

DETAILED DESCRIPTION

The invention is a self-inflating pumping or compression mechanism for use on bicycles and other similarly wheeled applications. In one embodiment, the compression mechanism rests on the inside surface of the tire. As the tire rolls and deforms under the wheel's load, the pumping mechanism collapses and pushes air into the tire. When the tire returns to its original shape, the pumping mechanism returns to its original shape drawing in air from the atmosphere. The pumping mechanism runs circumferentially around the inside of the tire. The invention employs rigid lower surface having lever arms that are split along the lower surface length allowing the lever arms to move easily about a fulcrum while retaining excellent ride quality.

A self-inflating tire system draws in air from the atmosphere and pushes it into the tire while the tire is in motion. A series of one or more check valves ensure the air moves only one way through the system. In one embodiment, a compression device is provided that is disposed in the tire, where the compression device operates on a lumen, or has a lumen structure as part of the device, that is pneumatically in contact with the atmosphere.

Figure 1A:
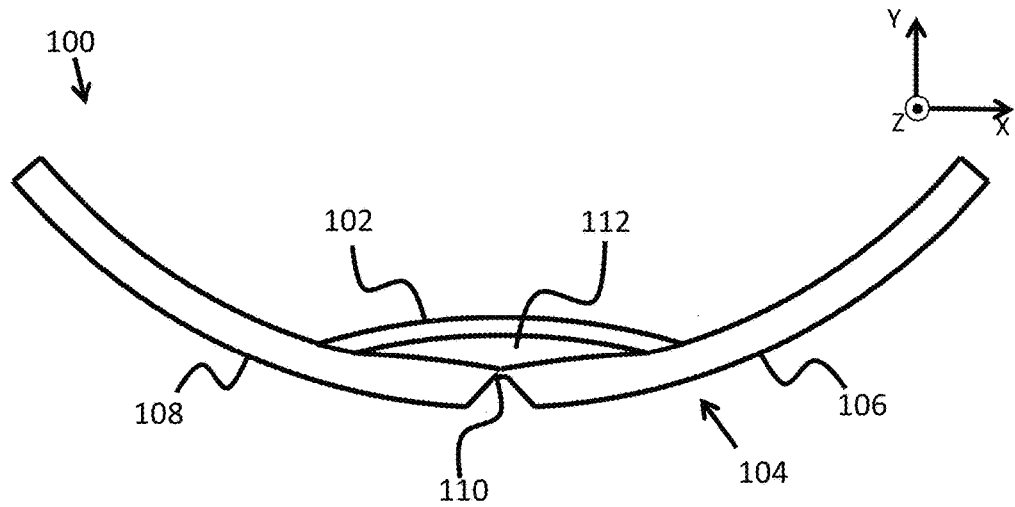
FIGS. 1A-1B show a compression device for a self-inflating tire, according to one embodiment of the invention.
Figure 1B:
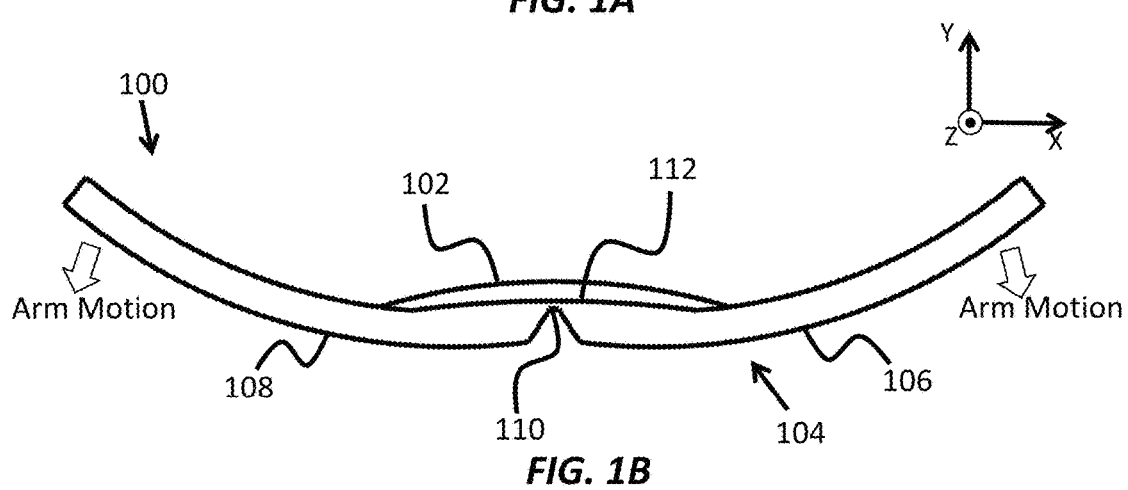
Figure 1C:
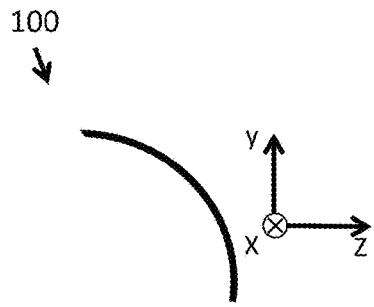
FIGS. 1C-1D show a compression device spanning a partial tire circumference and a complete tire circumference, respectively, according to embodiments of the invention.
Figure 1D:
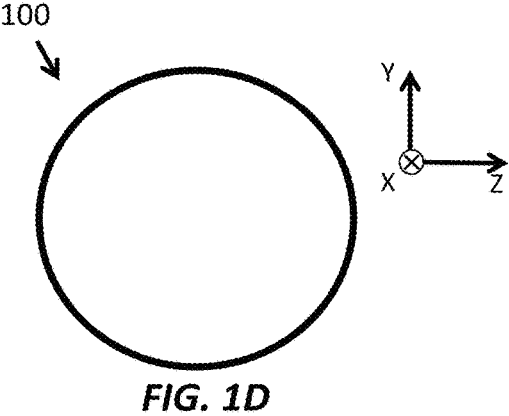

According to one embodiment, FIGS. 1A-1B show the compression device 100 for a self-inflating tire that includes an elastic material 102 having a curved cross section in an X-Y plane and an arc-shape length along a Y-Z plane, where the length along the Y-Z plane is configured to conform to an inner surface of a tire 200. The device 100 further has a flexible memory material 104 that is disposed on the second elastic material 102, where the first elastic material 104 includes a cross section in the X-Y plane having a second arm 106, a first arm 108 and a fulcrum 110, where the fulcrum 110 is disposed between the second arm 106 and the first arm 108. According to the invention, FIGS. 1C-1D show the device having an arc-shape length along the Y-Z plane that is configured to conform to the inner surface of the tire 200, where shown is the compression device 100 spanning a partial tire circumference and an entire circumference, respectively. As shown in FIG. 1A, the invention has a second state where a cross section of the second surface and first elastic material 104 includes a pumping chamber 112 disposed there between, and FIG. 1B shows the device 100 having a first state where the second surface elastic material 102 and first elastic material 104 collapses the pumping chamber 112 according to movement by the second arm 106 and the first arm 108 about the fulcrum 110, where collapsing the pumping chamber 112 forms a pumping element 100 for the self-inflating tire 200.

Figure 2:
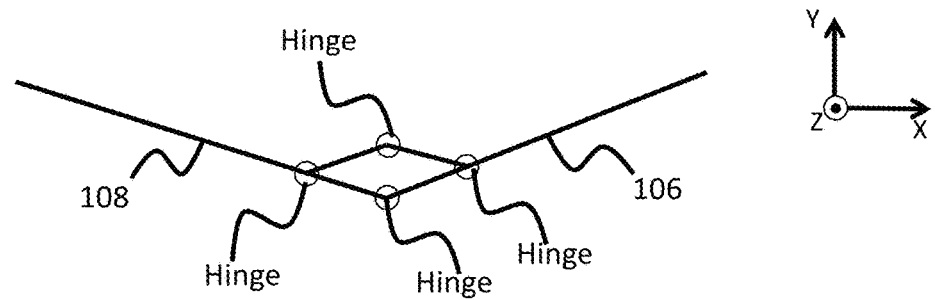
FIG. 2 shows a mechanical model of the compression device depicted as a 4-bar mechanism, according to one embodiment of the invention.

In one embodiment, FIG. 2 shows a mechanical model of the compression device depicted as a 4-bar mechanism. As shown, the hinges incorporated into the compression device to enable the compression device to move more freely. In further embodiments, the compression device incorporates living hinges of the same material or of different materials from the second and first arms. The placement of a hinge at the fulcrum is critical to the efficiency and functioning of the compression device. The hinges at points at the center and ends of the second surface are less important due to the small angle changes in these locations.

One key aspects of the compression device is the rigidity of the first surface, resulting in excellent ride quality. One would normally expect a rigid material to support the load directly and not flex, since the second and first arms are curved in the X-Y plane and project in an arc along the Y-Z plane. However this is not the case. The second arm and first arm of the first surface create an excellent riding profile without any high spots or ridges. When a load is applied to the wheel the second and first arms bend easily out of the way and allow the force to be concentrated on compressing the pumping chamber as shown in FIGS. 1A-1B and FIGS. 6A-6B.

As the second and first arms move from the unloaded position to the loaded position, the chamber collapses, thereby pushing air through a sealed chamber, or through a lumen 204 disposed in the pumping chamber, in the direction of rotation. A series of one or more one-way valves ensure the air moves through the self-inflating tire 200 system in one direction. The mechanism is in the unloaded position, herein known as the second state, when the tire 200 is pressurized and not deformed by a load placed on the tire 200. The mechanism is in the loaded position, herein known as the first state, when the tire 200 is de-pressurized and deformed by a load placed on the tire 200. The loaded tire 200 flattens and becomes wider in the area of the tire 200 in contact with the riding surface, as shown in FIGS. 1A-1B and FIGS. 6A-6B. It is this shape change that the invention enables pumping of the air. In the unloaded, second state position, the round shape of the tire 200 supports the second and first arms of the compression device. The geometry and material properties of the second and first surfaces support the pumping chamber so it does not collapse in the pressurized environment of the tire 200. In the loaded, first state position, the second and first arms flatten by rotating about the fulcrum and the included angle of the second and first arms increases 20-60 degrees when viewed from the cross-sectional view of FIG. 1A. In one embodiment, the compression device has been engineered to close when the internal angle opens 20 degrees. Utilizing smaller angle changes allows the compression device to operate when less tire deformation is present. Tires deform less under higher pressure and when supporting less load. The angle change closes the pumping chamber as the second and first arms press on the second surface. Because the second and first lever arms are significantly wider than the second surface, there is considerable force multiplication. This allows the compression device to generate higher pressure than the pressure found in the tire 200. Increasing the width ratio between the second and first arms and the second surface increases the force multiplication. Another beneficial aspect of the invention is that the pumping chamber collapses horizontally in the same way as the tire 200. This is beneficial in that the pressure inside the tire 200 works in conjunction with the lever arms to pump the air.

In further embodiments, the compression device is placed on the outer surface of an inner tube 202 having an integrated pumping chamber, as shown in FIG. 5, or the compression device and pumping chamber are placed outside the inner tube as shown in FIG. 6A. The invention may be used in a tire 200 with an inner tube, as shown in FIG. 6A, or without an inner tube, as shown in FIG. 6B. The lever arms are held in position by the air pressure inside the inner tube, as shown in FIG. 6A, or the inside surface of the inner tube as shown in FIG. 5. In the embodiment shown in FIG. 6A, the compression device is positioned outside the inner tube and is held in position by the outside of the inner tube and the inside surface of the tire 200. In the case where no inner tube is used, as shown in FIG. 6B, the compression device is held in place by the pressure inside the tire 200. The bottom surface of the second and first arms conforms to the pressurized, un-loaded shape of the inside of the tire 200. The invention may also include a low-friction material on the surface of the second and first arms that touches the tire 200. A low-friction material may also be used on the inside of the tire 200 to further minimize friction between these surfaces.

In another embodiment, the compression device completely encircles the tire 200, as shown in FIG. 1D, or can partially encircle the tire 200, as shown in FIG. 1C, for example the length of the compression device along the Y-Z plane can be as short as 10 mm. Each embodiment must weigh a number of variables such as weight, balance, pumping volume, max pumping pressure, lifespan and cost to optimize for the intended application.

The mechanical force of the second and first arms increases by increasing the stiffness. This can be done through material choice or increasing the thickness and width of the lever arm in the X-Y plane. The greater the stiffness of the lever arm the more force can be generated. However as the lever arm also has a component in the Y-Z plane, the system must balance the benefit of the system in all three dimensions.

The second surface structure is dictated by the following three requirements. Second, its primary purpose is to resist the pressure in the tire 200 at maximum pressure and not collapse. First, during the compression cycle it must not fail due to tension. And third, it must successfully meet life test and reliability requirements. The upper second surface does not have the same stiffness requirements as the first surface.

In one embodiment 300 the second surface and pumping chamber are integrated into the inner tube extrusion, as shown in FIG. 5. In this embodiment, the material located above the pumping chamber must successfully perform the three above mentioned functions of the second surface plus it must resist stretching to generate high enough pressures required by the pumping chamber.

Figure 1E:
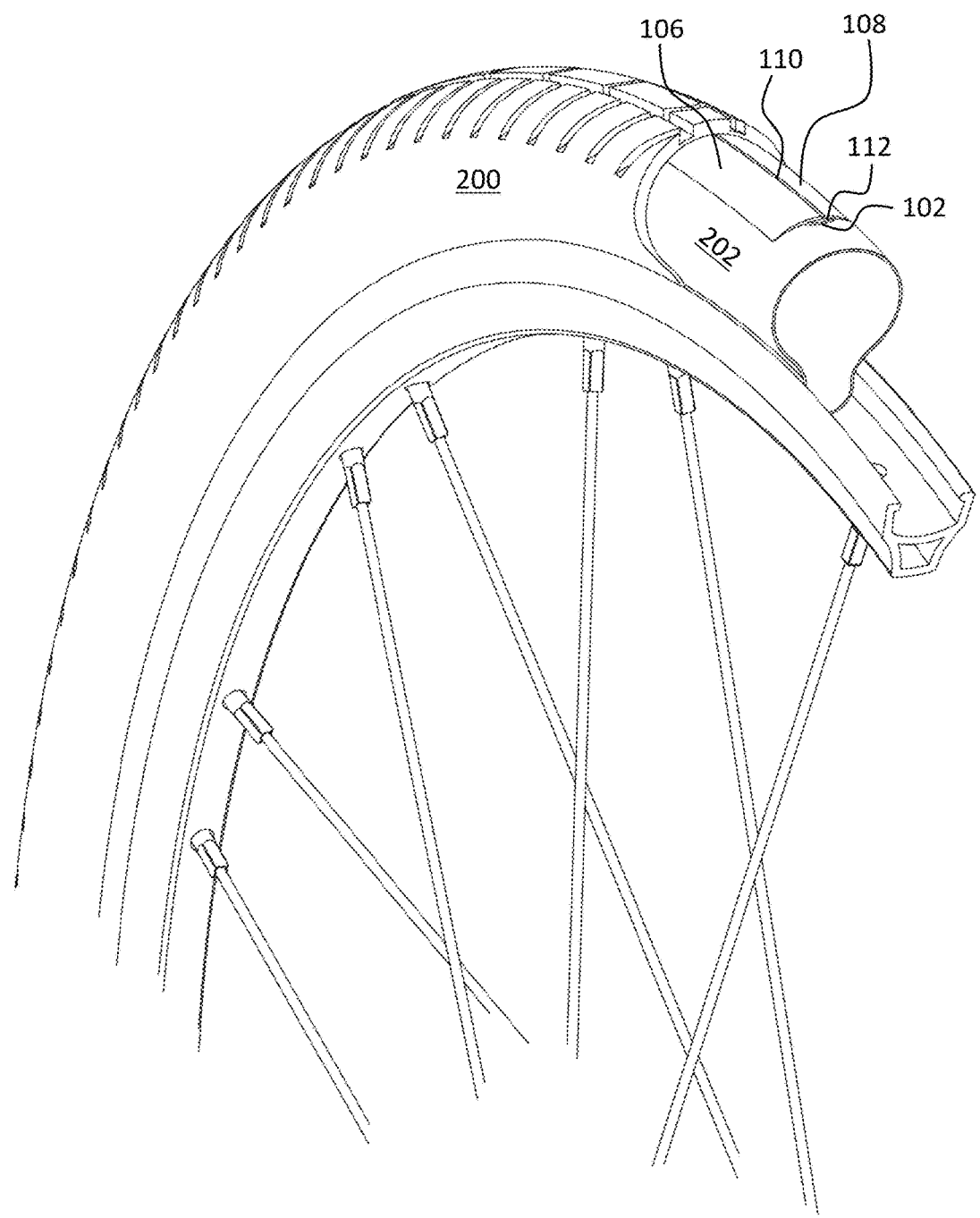
FIG. 1E shows a compression device implemented to a tire and inner tube, according to embodiments of the invention.

The invention has further benefits in that it also reduces flat tires due to puncture. In the embodiment shown in FIG. 1D, where the pumping mechanism goes completely around the major circumference of the tire 200, there is significant puncture-resistance improvement, where the puncture-resistance is provided by the first surface material. This is important due to the difficulty in differentiating between a flat tire 200 from slow diffusion of air and a flat tire 200 from a sharp object puncture. FIG. 1E shows a compression device implemented to a tire 200 and inner tube, according to embodiments of the invention.

The compression device can be made of rigid or semi-rigid materials, where the mechanical efficiency of the invention is enhanced by the second and first arms having increased rigidity. First surface materials include rubbers and plastics including ABS, Nylon, Delrin, PEEK, Natural rubber, NBR, TPE, fiberglass, Kevlar, aramid, carbon fiber, elastomers, thermoplastic polyester elastomers, Hytrel, Zytel, polymers, copolymers, resins and any other commercially available materials.

Figure 3:
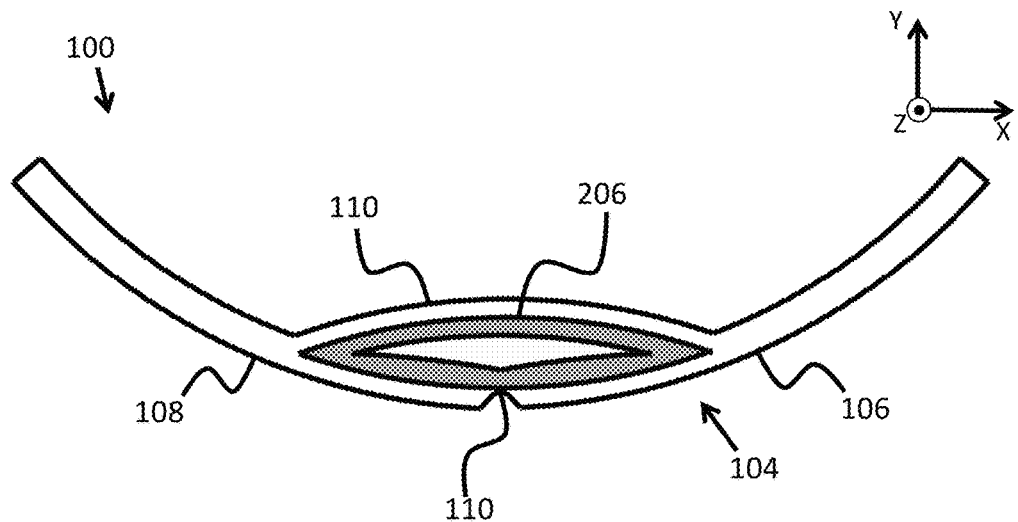
FIG. 3 shows the compression device with the compression cavity forming a shell and a sealing element therein, according to one embodiment of the invention.
Figure 4:
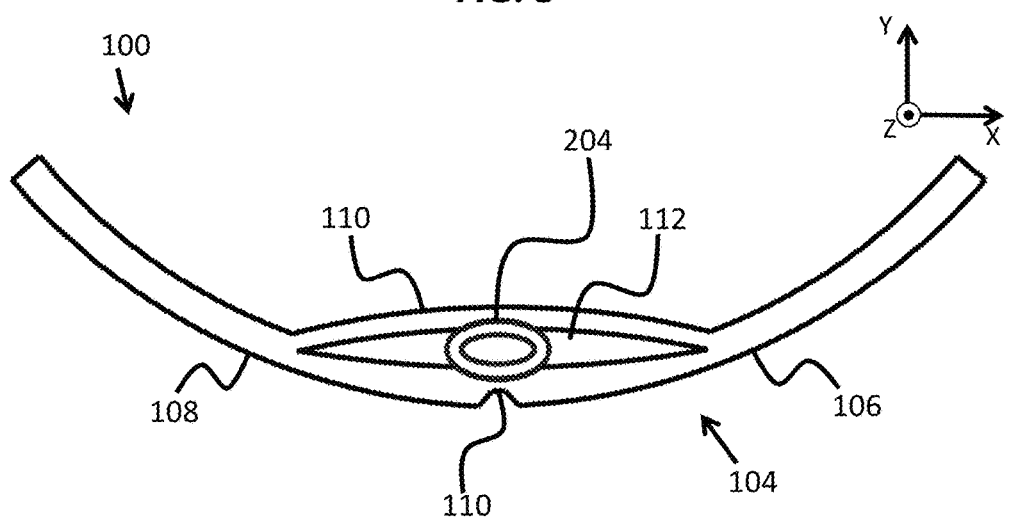
FIG. 4 shows the compression device with the compression cavity forms a shell and a separate lumen inserted therein, according to one embodiment of the invention.

Further embodiments include separating the pumping function from the sealing function in the system, as shown in FIG. 4. Here, the pumping chamber forms a shell and a separate lumen of sealing element 206 is used in the shell, as shown in FIG. 4 and FIG. 3, respectively. The sealing element 206 may be extruded, injection molded or produced by any other method. The sealing element 206 can be optimized for durometer, geometry, wear, manufacturability and any other consideration.

FIG. 4 shows an embodiment with a separate lumen incorporated inside the pumping chamber. This further concentrates the closing force on an even smaller area and could have application where even higher pressures are required. The tubing may be made out of a variety of materials including, PVC, Tygon, Silicone, synthetic rubber, natural rubber, elastomers or any other type of material. In an exemplary prototype embodiment, the tubing used was natural rubber tubing with 1.5 mm inside diameter and 3.0 mm outside diameter. The area inside the pumping chamber, but outside the external tubing may be at 0 bar, 1 bar or even the pressure inside the inner tube. The first surface was constructed from 2.2 mm thick PVC bar stock that was heat formed to match the inner profile of a 38 mm×700 mm tire 200. The curved arc of the first surface measures 28 mm in the X-Y plane. The arc length in the Y-Z plane measures 1 m. The second surface was constructed of 1.0 mm thick PVC bar stock in a similar manner. The curved arc of the second surface measures approximately 10 mm in the X-Y plane. The two surfaces were joined at the hinge joints using nylon fabric and a cyanoacrylate adhesive.

In a further embodiment, the pumping chamber is the entire 200 space between the second and first surfaces or only some of the space between the second and first surfaces. For example the pumping chamber may have spaces to either side of it that are captured in the area between the second and first surfaces. This permits the cross section area of the pumping chamber to be reduced and serves as another embodiment for increasing the maximum generated pressure of the system.

Another prototype similar in cross section to FIG. 1 is designed for operation in a tire 200 38 mm wide by 700 mm diameter. In this embodiment the arc length of the first surface is 30 mm wide in the X-Y plane. The first surfaces reaches its maximum thickness of 1 mm just before the fulcrum 110 and tapers to 0.1 mm as the first surfaces extends outward in the X-Y plane. Both sides of the first surface are symmetrical and are joined in the center with a living hinge 110. The second surface is co-extruded with the first surface. The second surface is 10 mm wide in the X-Y plane and 0.5 mm thick. In its unloaded state, the second and first surfaces form a chamber 1 mm high by 9 mm wide. The prototype requires the internal angle of the first surface to open 20 degrees for the chamber to close. The prototype extends 0.5 m in the Y-Z plane.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed is:

1. A compression device for a self-inflating tire, comprising a flexible memory material, wherein said flexible memory material is mechanically connected to a pumping chamber, wherein said flexible memory material comprises:
   a. a first arm, a second arm and a hinge along an X-Y plane, wherein said first arm and said second arm are symmetrically joined by said hinge;
   b. an arc-shape length along a Y-Z plane that is configured to conform to an inner surface of a tire;
   c. a first state, wherein when in said first state, said flexible memory material is conformed to an unloaded, pressurized inner surface of said tire; and
   d. a second state, wherein when in said second state, said flexible memory material is collapsed radially outward about said hinge by said first arm and said second arm.

2. The compression device according to claim 1, wherein said pumping chamber comprises an elastic material that is disposed on an inner surface of said flexible memory material, wherein said pumping chamber comprises a curved cross section in an X-Y plane and an arc-shape length along a Y-Z plane.

3. The compression device according to claim 2, wherein said elastic material and said flexible memory material are anisotropic having greater rigidity in said X-Y plane compared to said Y-Z plane.

4. The compression device according to claim 1, wherein said pumping chamber comprises a pneumatically sealed pumping chamber.

5. The compression device according to claim 1, wherein said pumping chamber is configured to house a pneumatically sealed lumen.

6. The compression device according to claim 1, wherein said arc-shape length spans an entire circumference of said inner tire surface, or spans a segment of said circumference of said inner tire surface.

7. The compression device according to claim 1, wherein said hinge comprises a reduced-thickness of said flexible memory material relative to a thickness of said second arm and said first arm.

8. The compression device according to claim 1, wherein said compression device is irremovably attached to an inner tube.

* * * * *